United States Patent [19]

Holmes

[11] 3,767,057

[45] Oct. 23, 1973

[54] DATA CARD STORAGE TRAY

[76] Inventor: Lloyd W. Holmes, 800 Leopard, P.O. Box 1631, Corpus Christi, Tex.

[22] Filed: Sept. 13, 1971

[21] Appl. No.: 179,986

[52] U.S. Cl. 211/10, 206/73, 211/50, 211/126, 312/50, 312/140.3

[51] Int. Cl. B42f 17/12, B42f 7/10, A42b 63/00

[58] Field of Search 211/40, 10, 11, 211/50, 41, 126; 312/60, 50, 140.3, 140.4; 206/73; D6/140, 141

[56] References Cited

UNITED STATES PATENTS

| | | | |
|---|---|---|---|
| 537,853 | 4/1895 | Ramsay | 206/73 |
| 2,944,696 | 7/1960 | Effgen | 211/41 X |
| 269,418 | 12/1882 | Holton | 206/73 |
| D136,901 | 12/1943 | Halpern | D6/140 |
| D48,746 | 3/1916 | Foster | D6/140 |
| 1,415,110 | 5/1922 | Pearl | 211/11 |
| 936,725 | 10/1909 | Insinger | 211/126 |
| 2,275,664 | 3/1942 | Whitney | 211/40 |
| 1,810,199 | 6/1931 | Blakeslee | 211/41 |
| 2,769,550 | 11/1956 | Rollins | 211/11 |
| 2,689,571 | 9/1954 | Watkins | 211/11 X |

*Primary Examiner*—Roy D. Frazier
*Assistant Examiner*—Abraham Frankel
*Attorney*—W. F. Hyer et al.

[57] ABSTRACT

A data card storage tray is disclosed as including a base for supporting a plurality of partitions dividing the tray into parallel rows of storage areas and dividers dividing each of the rows into separate storage areas or slots for a data card. Each of the partitions are curved between longitudinal edges to permit data cards to be dropped into storage position in a vertical position and to be stored in an inclined position.

4 Claims, 5 Drawing Figures

LLOYD W. HOLMES
INVENTOR.

BY Hyer, Eickenroht, Thompson & Turner
ATTORNEYS

LLOYD W. HOLMES
INVENTOR.

BY Hyer, Eickenroht, Thompson + Turner
ATTORNEYS

DATA CARD STORAGE TRAY

This invention relates to a data card storage tray and in one of its aspects to such a tray which is particularly useful in automated card record retrieval systems.

The need for rapid record retrieval has resulted in the provision of a number of automated machines and systems which permit a number of data cards to be stored in a minimum amount of space and rapid retrieval of a specific stored card. An example of such a machine and system is the Kard-Veyer system, developed by Remington-Rand Corporation, in which cards are stored in trays on a revolving drum, and the operator can retrieve or file a specific card by selecting the appropriate reference code and dialing it into the machine. Machines such as this have found extensive use in banks, libraries, engineering companies, hospitals, etc., where large amounts of records must be kept and retrieved in a short time.

When using these types of machines, it is necessary for the operator to insert and remove cards with a certain amount of care to insure that the cards are in their proper order and are properly aligned in that order. Also, in retrieving a specific card, it is often necesary for the operator to thumb through a large number of cards since the cards are arranged in such a way that each individual card is not clearly identifiable without separating it from the remainder of the cards. These operations, when carried out many times during a day, somewhat reduce the effectiveness of the Kard-Veyer type of machine and result in loss of time and fatigue of the operator. A small saving in time and reduction in the necessary concentration of the operator for each act of data card placement or retrieval can thus result in a substantial increase in the effectiveness of the Kard-Veyer type of machine, since one operator may perform hundreds or thousands of these acts during a normal working day.

It is thus an object of this invention to provide a data card storage tray in which each of a plurality of data cards may be stored in separate areas of the tray.

Another object of this invention is to provide such a tray in which the data cards may be dropped in their separate storage area without interference from adjacent stored cards and without extreme care and concentration by the operator.

Another object of this invention is to provide such a tray in which a data card may be simply dropped into its storage area, and the card will be properly aligned in its storage area to provide a neat and orderly arrangement in which information on the card identifying it can be easily read by an operator.

Another object of this invention is to provide such a tray in which the above operation can be performed without the necessity of the operator physically separating adjacent stored cards.

These and other objects of this invention, which will become apparent from a consideration of the foregoing description, appended claims, and drawings, are accomplished in accordance with the preferred embodiment of this invention by providing a data card storage tray that includes a plurality of partitions dividing the tray into parallel rows of storage areas, and a plurality of dividing means dividing each of the rows into a plurality of separate storage areas or slots into which a data card can be placed. Each of the partitions is curved between longitudinal edges, and when a data card is placed or dropped into its storage slot in the tray, it will generally strike the curved wall of one of the partitions forming the slot. This curved wall will guide the card as it falls into the slot to insure that the card is properly aligned in its storage slot and will also permit the card to rest in its slot in an inclined position. The described guiding permits the card to be dropped into its respective slot without extreme care and concentration by the operator so that even though the card is dropped in at an angle other than the angle at which it is to be stored, the card will come to rest properly aligned. The storage of the card in an inclined position will also permit identifying information on the top of the card to be easily read by the operator to facilitate selection and removal of the proper card.

In the preferred embodiment of this invention illustrated in the drawings, each of the curved partitions are venetial blind slats which are readily available and facilitate construction of the tray. The tray includes a bottom plate which has a plurality of narrow, parallel, slots traversing the bottom, and one edge of each venetial blind slat can be placed in one of the slots to form upright extending partitions. Each slat is placed in its respective slot so that it is curved from the front of the base of the tray to the back, and the space between adjacent slats forms a storage row for the data cards. The dividing means is formed by a plurality of rods that pass from the front of the tray to the back and through openings in each of the slats near its upward extending edge. The rods are spaced apart to provide suitable storage slots in each row, and the openings in the slats that the rods pass through are preferably sized so that the upper longitudinal edge of the slats frictionally engages the rods to at least partially anchor these edges against substantial movement toward or away from each other.

Other features and advantages of this invention will become apparent to those skilled in the art upon consideration of the complete specification including the appended claims and drawings illustrating a preferred embodiment of this invention, and wherein:

Figures 1, 2:
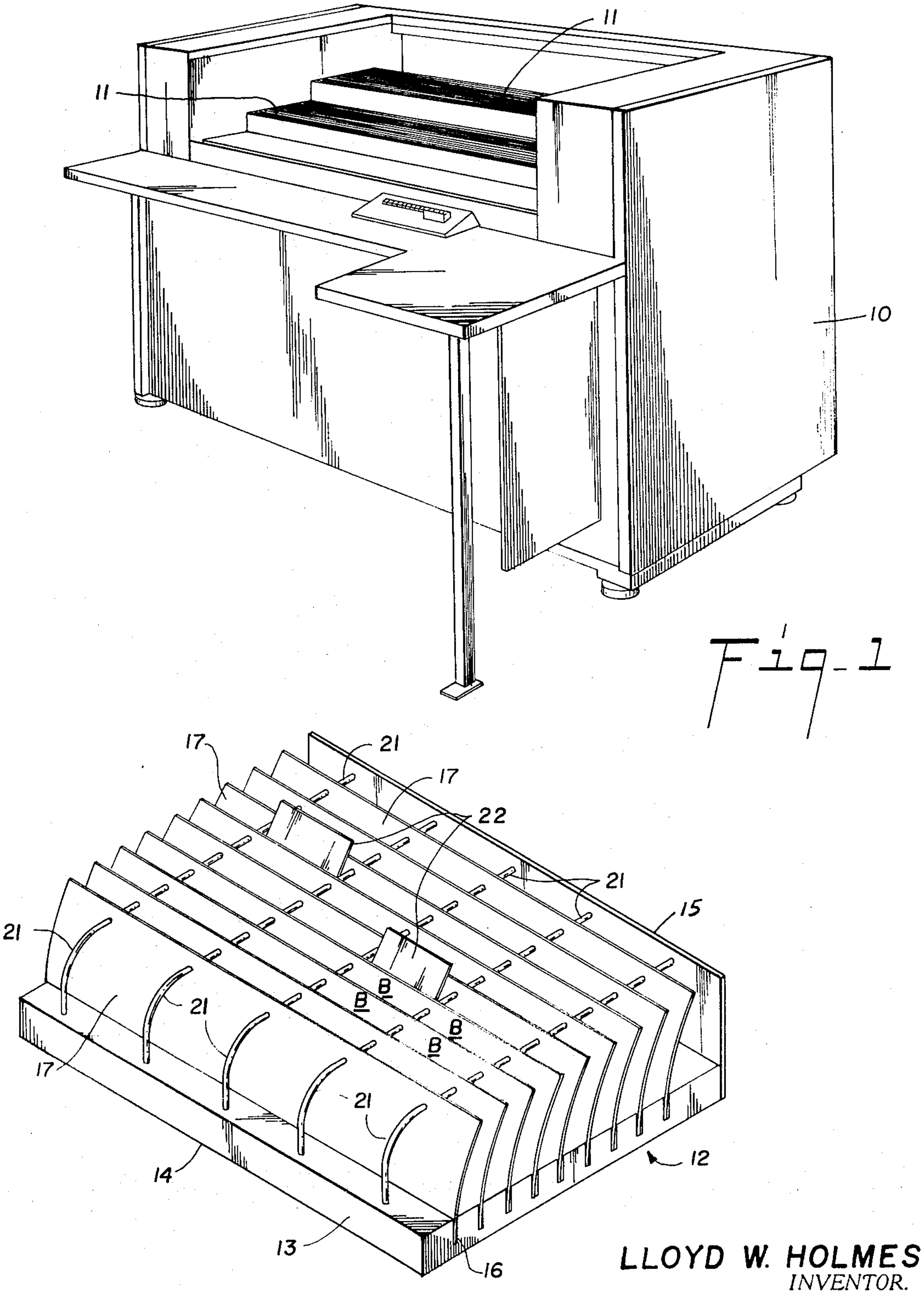
FIG. 1 is a perspective view of an automatic data card retrieval machine which utilizes the data card storage tray of this invention.
FIG. 2 is a perspective view of a preferred form of the data card storage tray of this invention.

In FIG. 1 a Kard-Veyer machine 10 is illustrated as including a plurality of storage bins 11 which are mounted on a rotatable drum (not shown) so that the contents of each bin can be selectively presented to the operator of the machine when called for. Each of the bins 11 usually includes a tray or a plurality of trays in which data cards are stored. Machine 10 and bins 11 illustrate the type of apparatus in which the data card tray of the present invention may be used, replacing the data card trays normally placed in bins 11.

Figure 3:
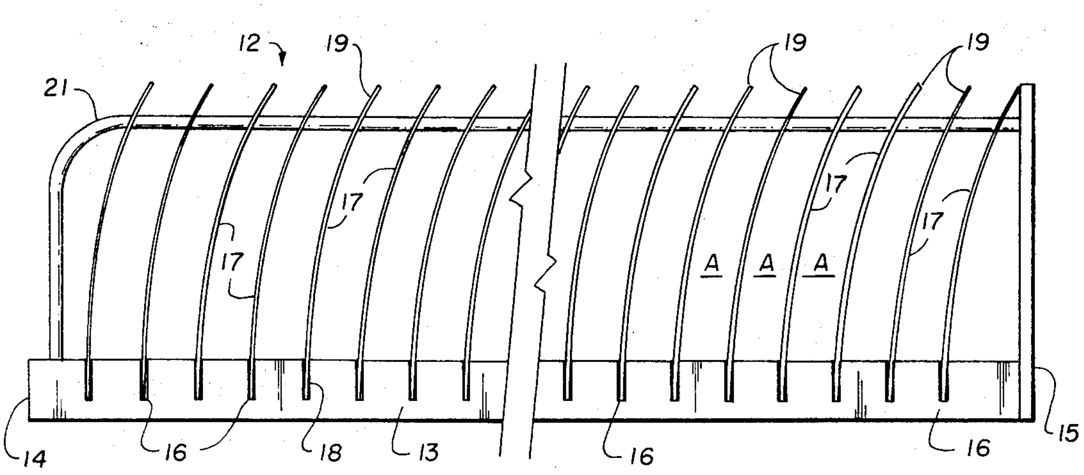
FIG. 3 is a side view of the tray of FIG. 2.

In FIG. 2 a data card tray 12 of this invention is illustrated as including a base plate 13 which is sized to fit into one of bins 11, and includes a front edge 14 and a back plate 15 arranged so that when tray 12 is in one of bins 11, front edge 14 is in the front of the bin (towards the operator) and back plate 15 is in the back of bin 11. Base 13 includes a plurality of elongated slots or channels 16 traversing base 13 and parallel to front edge 14 and back plate 15. A plurality of elongated partitions 17 each having a lower longitudinal edge 18 and an upper edge 19 are placed along lower edge 18 in slots 16 and thus traverse base 13 parallel to each other. The space between each of partitions 17 define parallel storage rows A between front edge 14 and back plate 15, one row A being disposed behind the other. As illustrated in FIGS.2 and 3, partition 17 is curved from lower edge 18 to upper edge 19 and thus curves towards back plate 15 so that lower edge 18 is closer to the front of the tray than upper edge 19. Partitions 17 may be made of thin metal or plastic, and for this purpose standard venetial blind slats have been found to be particularly suitable. Slots 16 should be of sufficient depth and of narrow width so that partitions 17 when inserted into slots 16 have a tight fit and will stand upright and be fairly rigid.

The upper edge 19 of each of partitions 17 includes a plurality of small circular openings 20 spaced along the edge 19. Means for dividing each of the parallel storage rows A between partitions 17 is provided and preferably includes a plurality of dividing rods 21 extending from front edge 14, through openings 20 and connected to back plate 15. Dividing rods 21 thus divide each of storage rows A into adjacent card storage slots B, into which data cards, such as illustrated by the number 22, can be placed and stored. Of course, the number and size of storage slots B depends on the spacing between openings 20 and rods 21 and this in turn depends on the size of data cards 22. It is preferred that the width of slots B not be substantially greater than the width of data cards 22 so that space is conserved. Also, the width of storage rows A (i.e., the space between adjacent partitions 17) should be such that cards 22 can be easily dropped into slots B without interference. In a tray constructed in accordance with this invention, 2 inch wide venetial blind slats for partitions 17 and a ⅝ inch thick wooden base plate 13 are used. Slots 16 are about ½ inch deep and about 1/32 inch wide, and spaced one-half inch from each other. With this arrangement the space between parallel partitions 17 is about ½ inch wide and storage slots B about 1-½ inch deep. The curvature of partitions 17 is such that the top edge 19 is offset towards the back plate 15 by about one-half inch from the lower edge 18.

Figure 4:
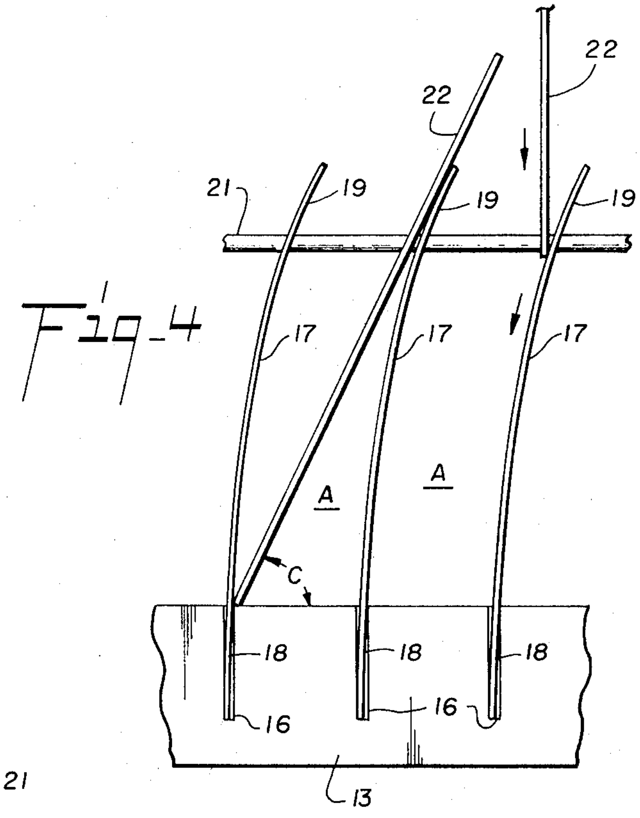
FIG. 4 is an enlarged view of a portion of FIG. 3 showing the placement and storage of a data card in one of its storage slots.

Also, as illustrated in FIG. 4, an important feature of this invention is that as cards 22 are dropped into storage slots B they will strike the curved wall of the partitions 17 forming the back of slot B and be forced to fall into slot B in an inclined position and to come to rest in storage slot B in such a position. As shown in FIG. 4 card 22 will generally bear at its bottom against the partitions 17 in front of it and rest against the curved wall of the partitions 17 in back of it, causing card 22 to lie with an acute angle C with respect to the surface of base 13. In the embodiment shown, acute angle C is about 60°. Of course, angle C should be such that the portion of card 22 which extends above partitions 17 will be easily read by an operator occupying a normal working position. Also, angle C is determined by the spacing between partitions 17 and the amount of curvature of each of the partitions and different spacings and degrees of curvature may be found suitable for different applications. The above described tray made in accordance with this invention is designed to store patient data cards for use in a hospital and has been found to be very satisfactory for this purpose and much more convenient to use than prior conventional storage trays.

Figure 5:
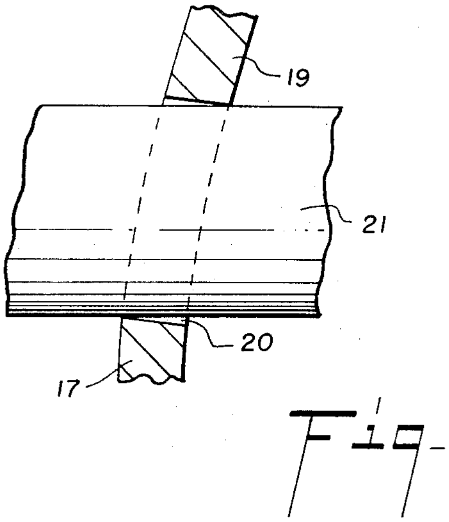
FIG. 5 is an enlarged view showing one of the dividing rods of the tray of FIG. 3 passing through an opening in one of the slat partitions.

As illustrated in FIG. 5, it is preferred that openings 20 be sized with respect to rod 21 so that a slight interference fit is provided which adds rigidity to the construction of the data card tray.

As should be apparent from the above description, a data card tray is provided in which the data cards can be easily placed and removed without undue operator concentration. The data cards will automatically be caused to lie in a position which facilitates identification of the cards and provides a neat and orderly appearance. The use of such a tray can result in substantial savings in operation time and fatigue and result in more beneficial use of automated card retrieval systems. The tray can be easily constructed to fit a particular usage at a reasonable cost. Also, while the data card tray of this invention has been described in the context of use in a Kard-Veyer type of machine, the tray has utility in and of itself as a data card storage device and, of course, can take many different forms from that described.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth are shown in the accompanying drawings is to be interpreted as illustrative and not in a limiting sense.

The invention having been described, what is claimed is:

1. Apparatus for separately storing a plurality of card-like articles comprising, in combination: a base including a plurality of spaced-apart slotted openings traversing said base, a plurality of elongated partitions transversing said base and extending upwardly therefrom, each of said partitions being mounted along one of its longitudinal edges in one of said slotted openings, said partitions being curved between elongated edges in a direction from the front of said base to the back thereof, and defining rows of storage areas in which such card-like articles may be stored in an inclined position, the curvature of said partitions being such that when said articles are in said storage areas they are resting in an inclined position having an acute angle so that identifying information on the top of the articles is easily read from any convenient operating position, and a plurality of dividing means for dividing each of said rows into separate storage slots for each of said articles, said dividing means including a plurality of spaced-apart rods each supported near the front and the back of said base and extending from said front through each of said partitions near their upper edges to the back, said rods passing through openings in each of said partitions with substantially an interference fit.

2. The apparatus of claim 1 wherein said partitions are venetial blind slats.

3. The apparatus of claim 1 wherein said acute angle is about 60°.

4. The apparatus of claim 3 wherein said partitions are venetial blind slats.

* * * * *